United States Patent
Gates et al.

[19]

[11] Patent Number: 6,149,115
[45] Date of Patent: Nov. 21, 2000

[54] MOUNTING APPARATUS FOR COMPONENTS AND ASSEMBLIES

[75] Inventors: Frank Vernon Gates, Township of Toxbury, Morris County; Louis F. Haitmanek, Florham Park; Paul Wendell, Rockaway, all of N.J.

[73] Assignee: AT&T Corp., Middletown, N.J.

[21] Appl. No.: 09/221,867

[22] Filed: Dec. 29, 1998

[51] Int. Cl.[7] .................................................. F16L 33/035
[52] U.S. Cl. .............................. 248/222.11; 248/222.12; 403/326; 403/331
[58] Field of Search .......................... 248/226.11, 220.21, 248/221.11, 222.11, 222.12, 222.13, 229.21; 403/326, 329, 331

[56] References Cited

U.S. PATENT DOCUMENTS

| | | | |
|---|---|---|---|
| 1,303,090 | 5/1919 | McCray | 403/331 |
| 2,754,974 | 7/1956 | Larson | 248/222.12 |
| 3,532,317 | 10/1970 | Adler | 248/222.12 |
| 4,304,523 | 12/1981 | Corsmeier et al. | 403/326 |
| 4,612,603 | 9/1986 | Cook | 248/222.12 |
| 4,798,129 | 1/1989 | Staub, Jr. | 248/222.13 |
| 4,974,798 | 12/1990 | Harding et al. | 248/222.12 |
| 5,244,300 | 9/1993 | Perreira et al. | 403/331 |
| 5,332,183 | 7/1994 | Kagayama | 248/222.13 |
| 5,524,394 | 6/1996 | Szabo, Sr. et al. | 403/331 |
| 5,920,950 | 7/1999 | Young, III et al. | 15/250.32 |

*Primary Examiner*—Ramon O. Ramirez
*Assistant Examiner*—Jon A Szumny
*Attorney, Agent, or Firm*—Morgan & Finnegan, L.L.P.

[57] ABSTRACT

An apparatus for mounting a component having a housing, the housing including a backplate. The apparatus includes a pair of mounting tabs disposed on the backplate. Each mounting tab includes a support member attached to the backplate and a flange member attached to the support member. The mounting tabs are arranged so that the flange members are disposed towards each other. The apparatus also includes a bracket that includes a baseplate defining a plane and a mounting pad disposed on the baseplate in the plane. The mounting pad includes a central area, attached to the baseplate, and a finger attached to the central area. The finger projects in the plane and is articulable in the plane. The mounting pad may be disposed in a region between the support members of the mounting tabs and between the flange members of the mounting tabs and the baseplate.

18 Claims, 8 Drawing Sheets

MOUNTING APPARATUS FOR COMPONENTS AND ASSEMBLIES

FIELD OF THE INVENTION

The present invention relates to a mounting mechanism for component and assembly enclosures.

BACKGROUND OF THE INVENTION

In the modem office environment, it is often necessary to mount electrical or electronic components or assemblies on vertical surfaces, such as walls. For ease of installation, it is desirable to use a mounting mechanism that depends only on gravity to hold the component or assembly in place. In the past, a keyhole/mounting peg arrangement was used. This prior art arrangement requires vertical clearance above the ultimate position of the component or assembly, in order to install the component or assembly. In many locations, vertical clearance is limited. For example, if a component or assembly must be mounted above a doorway, the vertical clearance is between the top of the doorway and the ceiling. A problem arises in that, in many such locations, there is insufficient vertical clearance to mount a component or assembly using prior art mounting schemes.

SUMMARY OF THE INVENTION

The present invention solves the problem of mounting components or assemblies close to ceilings, walls and/or floors with the mounting mechanism depending only on gravity to hold it in place. A positive mechanical locking feature to prevent disassembly during vibration is also provided.

The present invention is an apparatus for mounting a component having a housing, the housing including a backplate. The apparatus includes a pair of mounting tabs disposed on the backplate. Each mounting tab includes a support member attached to the backplate and a flange member attached to the support member. The mounting tabs are arranged so that the flange members are disposed towards each other. The apparatus also includes a bracket that includes a baseplate defining a plane and a mounting pad disposed on the baseplate in the plane. The mounting pad includes a central area, attached to the baseplate, and a finger attached to the central area. The finger projects in the plane and is articulable in the plane.

In one aspect of the present invention, the mounting pad is disposed in a region between the support members of the mounting tabs and between the flange members of the mounting tabs and the baseplate.

In one aspect of the present invention, the finger of the mounting pad includes a locking tab that engages with a support member of one housing pad. In another aspect of the present invention, the finger of the mounting pad further includes a disassembly slot.

In one embodiment of the present invention, the mounting pad further includes another finger attached to the central area.

In one embodiment, the mounting tabs are parallel to an edge of the backplate. In another embodiment, the mounting tabs are not parallel to an edge of the backplate.

In one embodiment, the mounting pads are plastic. In another embodiment, the mounting pads are metal.

BRIEF DESCRIPTION OF THE DRAWINGS

The details of the present invention, both as to its structure and operation, can best be understood by referring to the accompanying drawings, in which like reference numbers and designations refer to like elements.

DETAILED DESCRIPTION OF THE INVENTION

The present invention is a mounting apparatus for components and assemblies that depend only on gravity to hold them in place.

Figure 1:
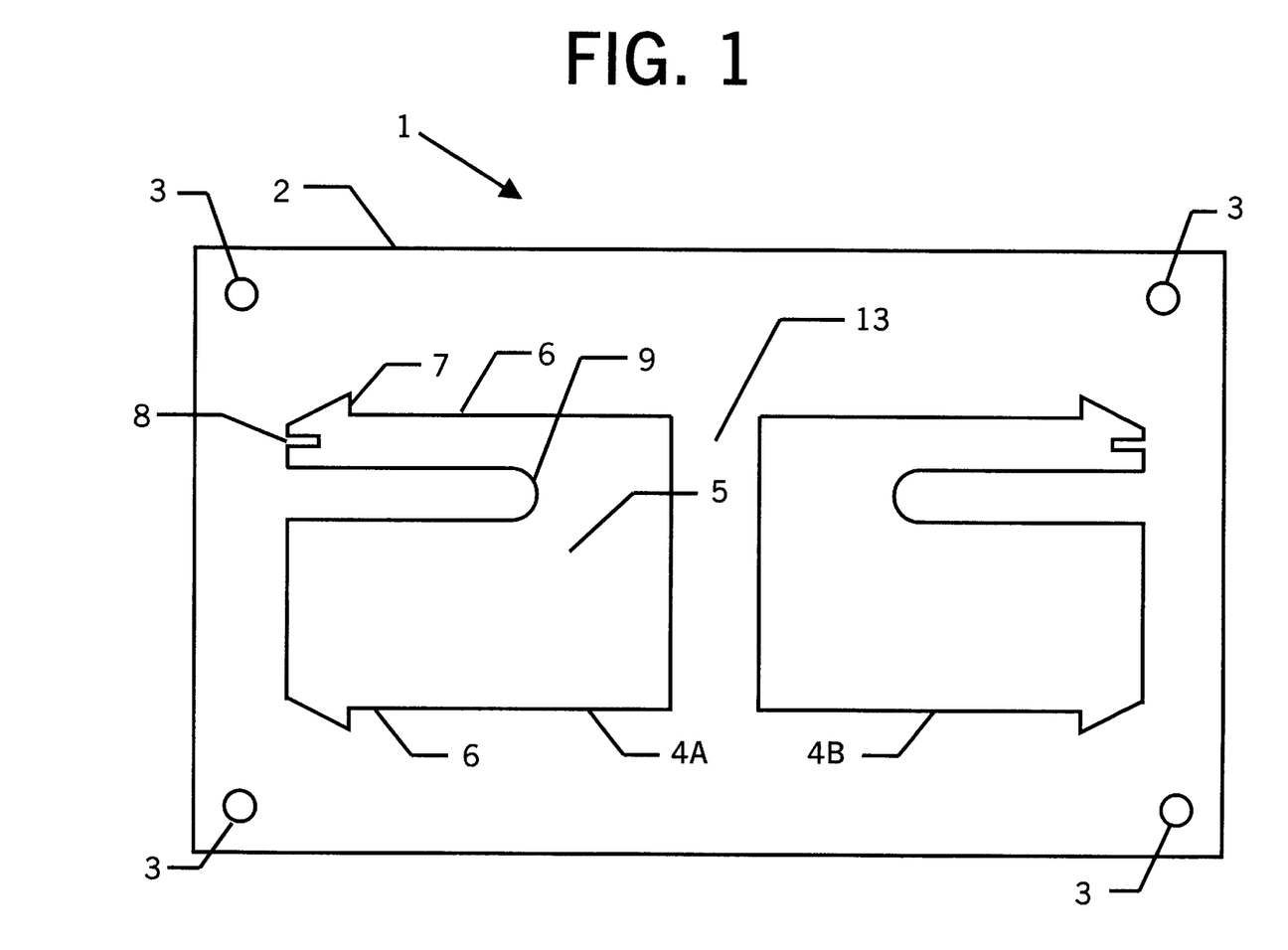
FIG. 1 is a view of one embodiment of a mounting bracket, according to the present invention.

The present invention includes two parts: a bracket that is to be attached to a vertical surface, such as a wall, and mounting tabs attached to the housing of the component or assembly to be mounted. The bracket 1 is shown in FIG. 1. Bracket 1 includes a baseplate 2, a plurality of mounting holes 3, and a plurality of mounting pads 4A–B. Baseplate 2 is typically generally rectangular, but may instead be circular, oblong or other shapes. Baseplate 2 is typically flat, for mounting on a flat surface, such as a wall. If bracket 1 is to be mounted on an unflat or irregular surface, baseplate 2 may instead be shaped to match or accommodate the unflat or irregular surface. In addition, cutout areas may be provided along the edges or in the interior area of baseplate 2 to accommodate features of the surface to which the bracket is mounted, or to allow access by wiring, etc.

Mounting holes 3 are dispersed about baseplate 2 and allow the baseplate to be fastened to a vertical surface using fasteners, such as screws. Typically, mounting holes 3 are located near the corners of baseplate 2, but mounting holes may also be located along the edges or in the interior area of baseplate 2.

Preferably, there are two mounting pads, such as pads 4A–B attached to baseplate 2. Mounting pads 4A–B are attached to baseplate 2 and provide the mounting and locking mechanism of the present invention. Mounting pad 4A is a mirror image of mounting pad 4B. Each mounting pad 4A–B includes a central area 5, which is attached to baseplate 2, and one or two mounting pad fingers 6. Each mounting pad finger 6 includes a locking tab 7 and a disassembly slot 8. Mounting pad fingers 6 may be affixed to central area 5, but are typically integral with central area 5. Mounting pad fingers 6 are flexible. Slot 9 is disposed between mounting pad finger 6 and the central area 5 of the mounting pad. If mounting pad 4A–B has two mounting fingers, then optional slot 10, optional locking tab 11 and optional disassembly slot 12 are present.

Disassembly slot 8 on the mounting tab is typically actuated using a screwdriver or other similar implement.

Figure 1A:
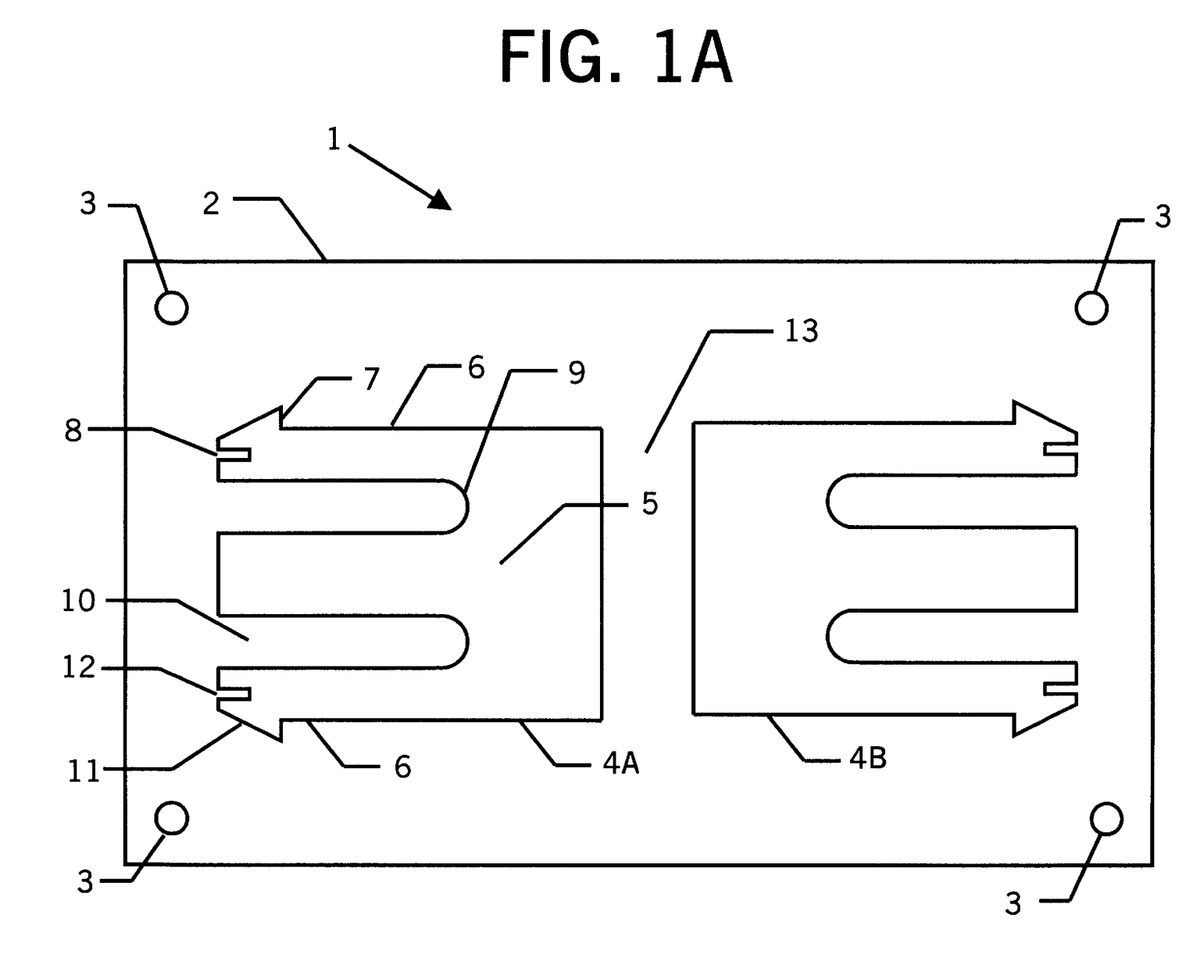
FIG. 1A is another embodiment of a mounting bracket according to the present invention

Slot 8 may be adapted to be actuated using a particular implement, and therefore may be a straight slot, cross recess, round, square, rectangle, oval or a tamperproof design. As can be seen, the disassembly slot mechanism is hidden behind the housing when the housing is mounted on the bracket, which provides increased security and improves aesthetics. Additional security may be provided by adding a proprietary security lock mechanism. FIG. 1A discloses another embodiment of the invention showing mounting pads 4A and B, one of which, or both, may include at least two mounting pad fingers 6.

Figure 2:
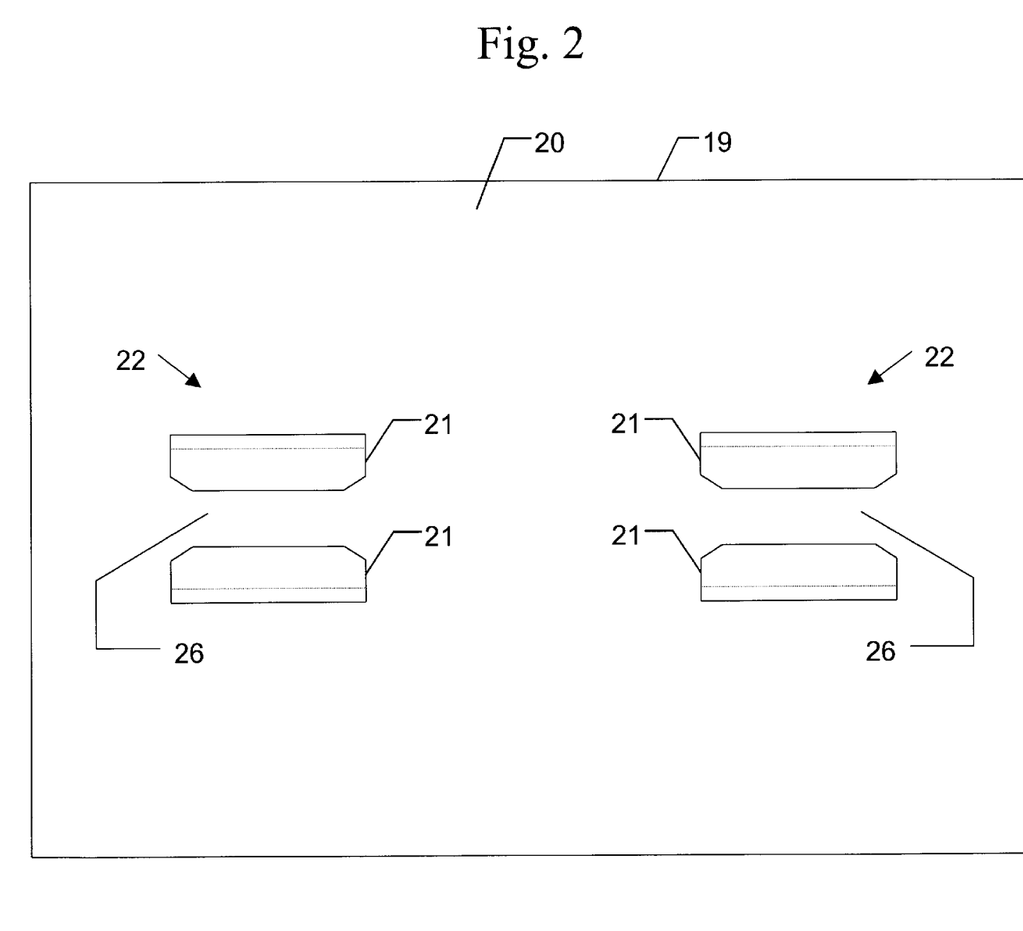
FIG. 2 is a view of a housing backplate, according to one embodiment of the present invention, that mates with the mounting bracket shown in FIG. 1.

A housing 19, according to the present invention, is shown in FIG. 2. Housing 19 includes a backplate 20 and contains the electrical or electronic components or assemblies that are to be mounted. Attached to backplate 20 are a plurality of mounting tabs 21. Mounting tabs 21 are preferably arranged in opposing pairs 22.

Figure 3:
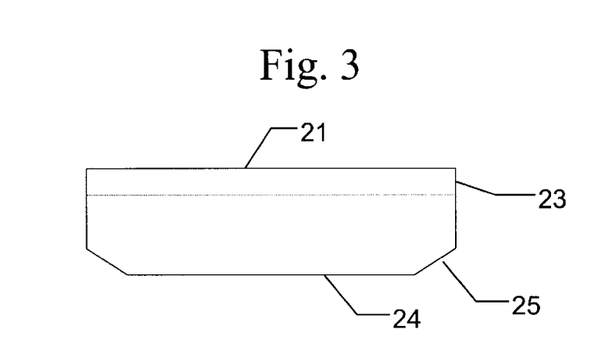
FIG. 3 is a front view of a mounting tab attached to the housing shown in FIG. 2.
Figure 4:
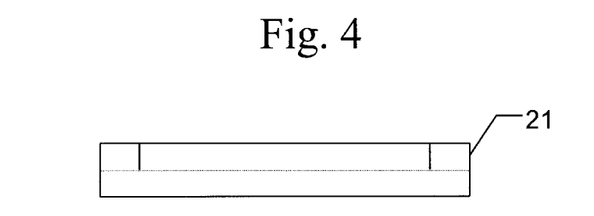
FIG. 4 is a top view of a mounting tab attached to the housing shown in FIG. 2.
Figure 5:
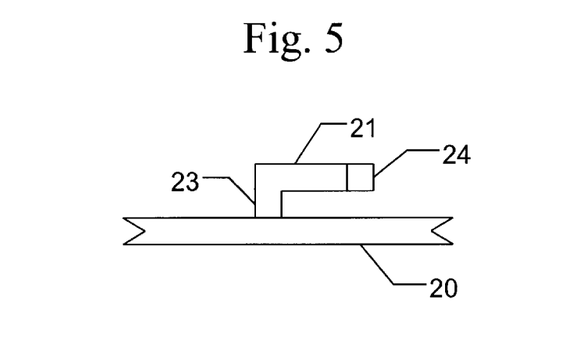
FIG. 5 is a side view of a mounting tab attached to the housing shown in FIG. 2.

The structure of a mounting tab 21 is shown in FIGS. 3–5. Mounting tab 21 includes a support member 23 and a flange member 24. Preferably, the overhanging corners of flange member 24 include bevels 25, which allow easier mounting of the component or assembly. As shown in side view in FIG. 5, mounting tab 21 is attached to baseplate 20 by the support member 23. Opposing pair 22 includes two mounting tabs 21 arranged so that the flange members 24 of each mounting tab 21 are towards each other, thus defining a region 26 into which a mounting pad will fit.

Figure 6:
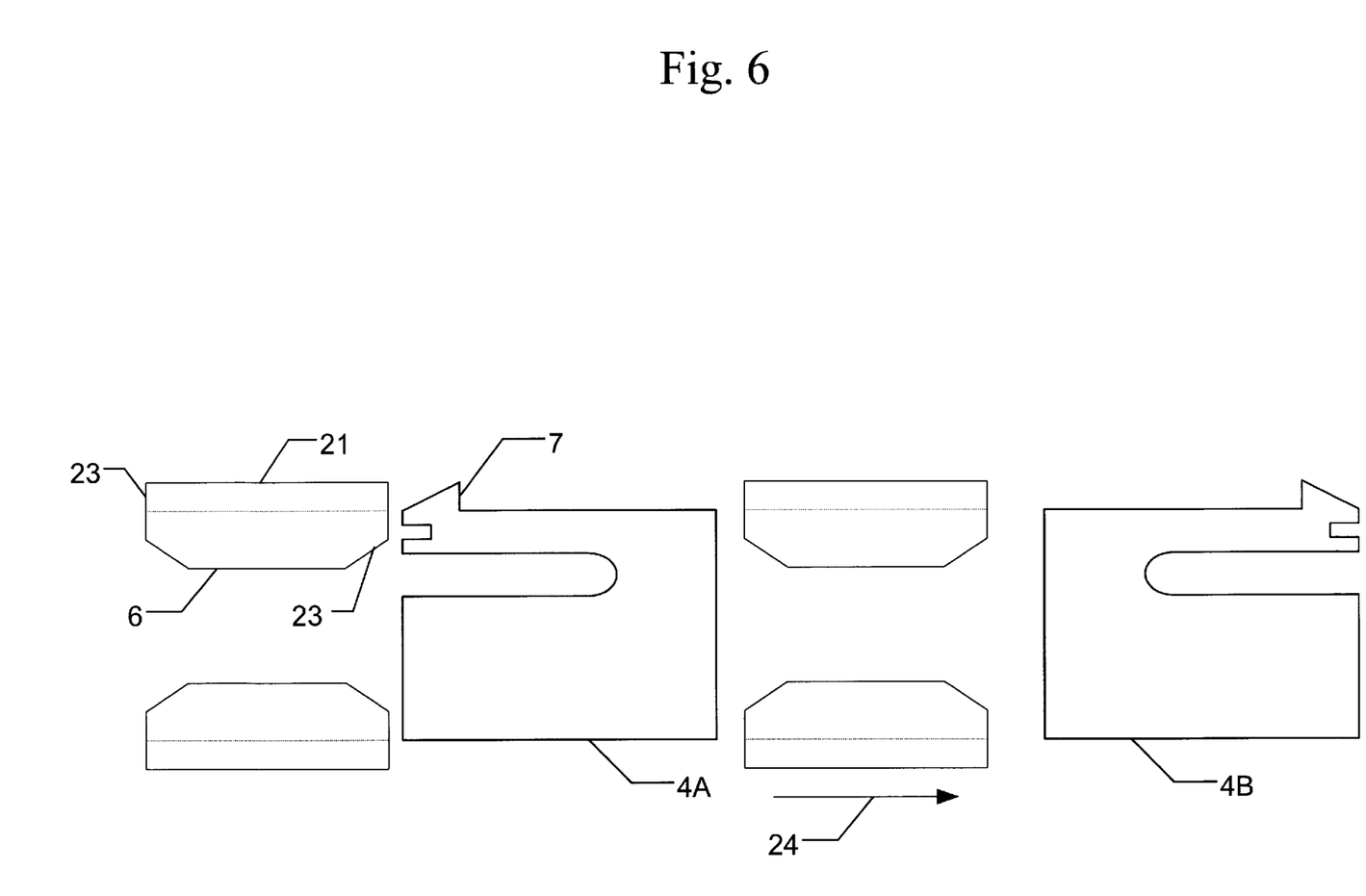
FIG. 6 shows the operation of the present invention.
Figure 7:
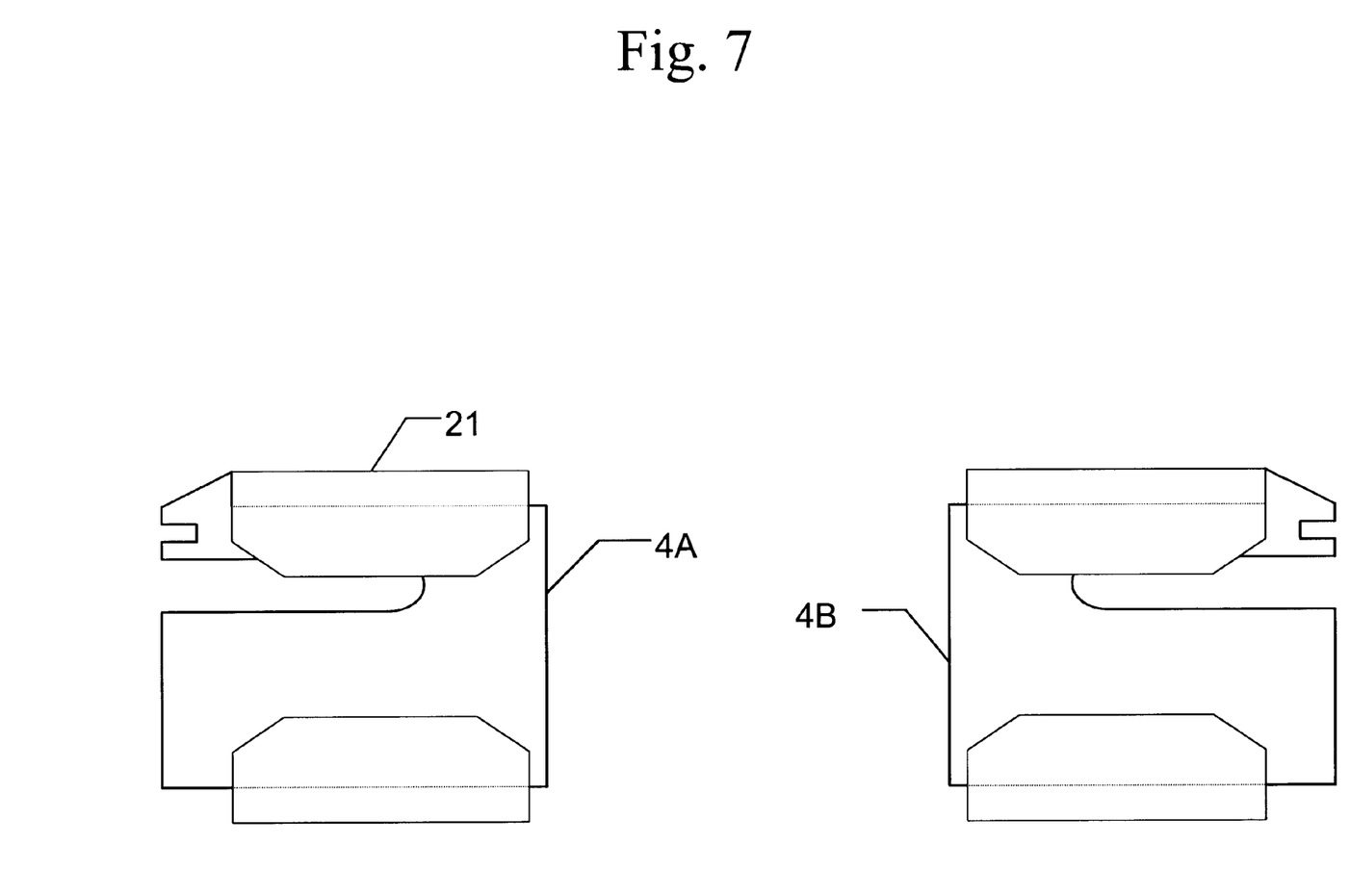
FIG. 7 shows the operation of the present invention.

An example of the operation of the present invention is shown in FIGS. 6–7. The first step in mounting a component or assembly is shown in FIG. 6. The housing (not shown) of the component or assembly, which has attached to it mounting tabs 21, is placed adjacent to the wall bracket (not shown). Mounting tabs 21 are, as a result, disposed adjacent to mounting pads 4A and 4B of the wall bracket. In the example shown in FIG. 6, mounting pad 4A is disposed between mounting tabs 21. The housing is then moved horizontally toward mounting pad 4B, as indicated by arrow 24. As shown in FIG. 7, the housing is moved until mounting pads 4A and 4B engage and lock with mounting tabs 21.

No vertical movement of the housing is required to mount the housing to the wall bracket. Only horizontal movement is needed. The horizontal movement may be to the right, as shown in the example of FIG. 6, or to the left. Thus, the invention allows various component(s) or assembly installations to be placed up against a ceiling, up against the left or right side of a wall or next to a floor. The present invention allows the limited space above a door frame to be utilized.

The present invention includes a mechanical locking mechanism that makes the mounting assembly withstand vibration and is also a security lock. As shown in FIG. 7, when engaged, the locking tabs 7 of both mounting pads 4A and 4B are engaged against mounting tabs 21 to provide the locking feature. The mechanical locking feature is anti-rotational and has a very low (minimal) height profile.

Figure 2A:
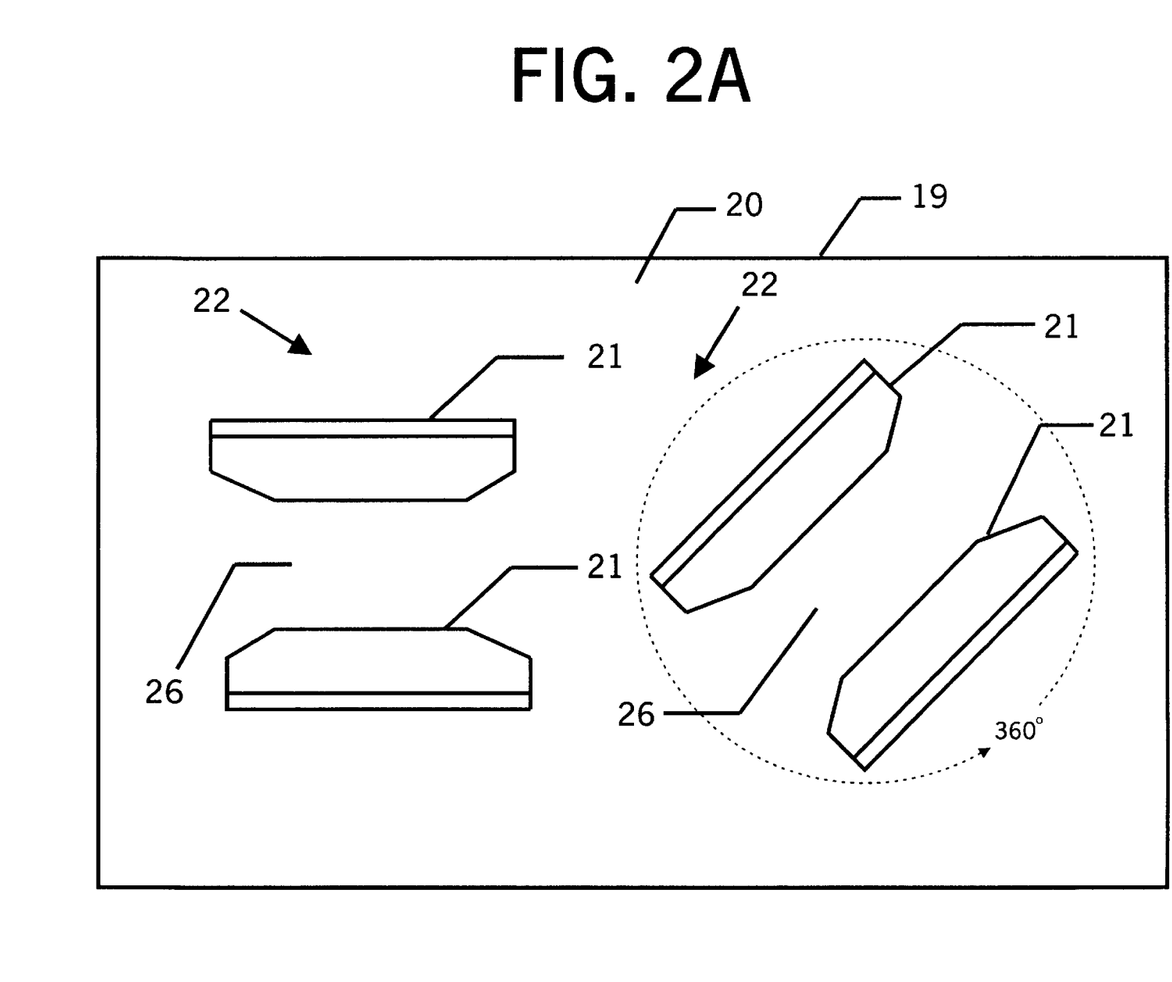
FIG. 2A is a representation of mounting pads angularly disposed on the backplate

Although the example in FIGS. 6–7 is a horizontal application in which the mounting tabs are parallel to the edge of the backplate, it is seen that the mounting tabs may be at any angle from 0 to 360 degrees from the horizontal orientation and still withstand the weight of the assembly and vibration. In some orientations, it is desirable to use mounting pads each having two mounting tabs. For various sizes and weight of components and assemblies, the number of mounting tabs and pads can be varied from one to as many as required to provide adequate mounting strength. Alternatively, as shown in FIG. 2A, the mounting pads 21 may be angularly disposed on the backplate, as further described hereinafter.

For every mounting configuration two mounting directions are possible. For example, referring to FIG. 6, a component may be mounted as shown, or in another embodiment, the component may be mounted in a position rotated 180 degrees from that shown.

Figure 8:
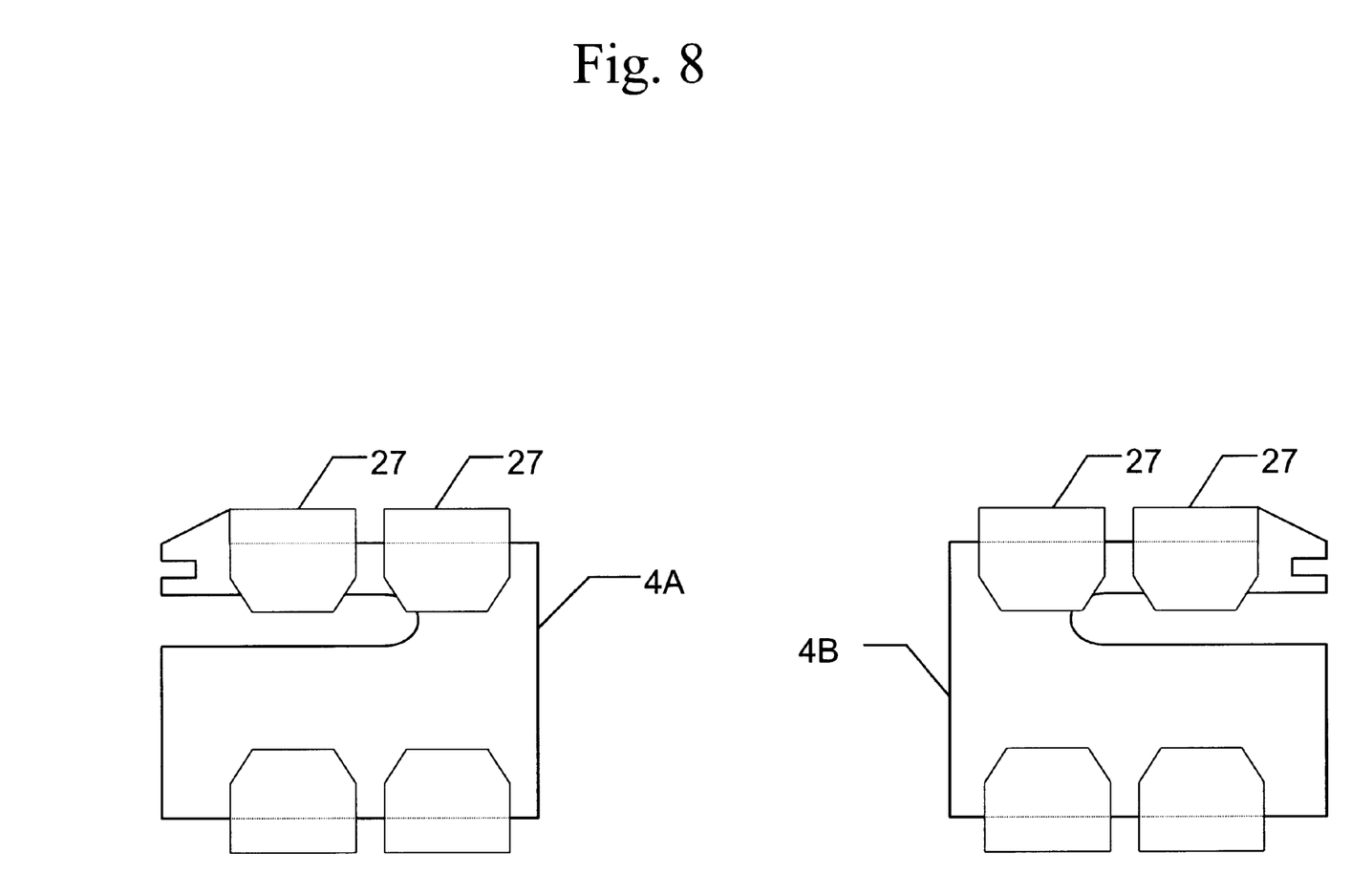
FIG. 8 is a view of a housing backplate, according to another embodiment the present invention.

The length of the mounting tabs may be varied as required to provide more or less stability to the mounting assembly. If the desired stability would require longer mounting tabs than can be conveniently produced, each mounting tab may be divided into a plurality of mounting tabs 27, as shown in FIG. 8.

Various characteristics of the present invention may be varied in order to vary the mounting installation and/or the locking force. These characteristics include the length, width and radius of the mounting tab slot 9, the height of mounting tab locking tab 7, and the thickness of the mounting tabs and the housing fingers. Likewise, the two sides of the slot 9 do not necessarily have to be parallel and can be varied in order to vary the engagement force. In addition, mounting installation force can be varied with the use of various materials (plastic, metal etc.) and combinations of same.

The distance 13 between the pads can be varied to allow for ease of mounting installation. For security purposes, the pads can be parallel but offset slightly to provide a "one way" dis-assembly known only to the installer.

Although specific embodiments of the present invention have been described, it will be understood by those of skill in the art that there are other embodiments that are equivalent to the described embodiments. Accordingly, it is to be understood that the invention is not to be limited by the specific illustrated embodiments, but only by the scope of the appended claims.

What is claimed is:

1. An apparatus for mounting an electronic component on a surface in a space limited area comprising:
   a housing adapted to contain the electronic component and including (i) a backplate and (ii) a pair of mounting tabs disposed on the backplate, each mounting tab including a support member attached to the backplate extending perpendicularly therefrom and a flange member attached to the support member and extending parallel to the backplate, the mounting tabs arranged so that the flange members are disposed towards each other; and
   a bracket secured to the surface comprising:
   a baseplate defining a plane and including a mounting pad disposed along and extending perpendicular to the baseplate in the plane, the mounting pad including (i) a central area, attached to the baseplate, and (ii) a finger attached to the central area, the finger projecting in the plane and articulable in the plane;
   whereby the mounting pad may be disposed in a region between the support members of the mounting tabs and between the flange members of the mounting tabs and the baseplate.

2. The apparatus of claim 1, wherein the finger of the mounting pad includes a locking tab that engages with the support member of one mounting tab.

3. The apparatus of claim 2, wherein the finger of the mounting pad further includes a disassembly slot.

4. The apparatus of claim 1, wherein the mounting pad further includes another finger attached to the central area.

5. The apparatus of claim 4, wherein each finger of the mounting pad includes a locking tab that engages with a support member of a different mounting tab.

6. The apparatus of claim 5, wherein each finger of the mounting pad further includes a disassembly slot.

7. The apparatus of claim 1, wherein a plurality of pairs of mounting tabs are disposed on the backplate and a plurality of mounting pads are disposed on the baseplate.

8. The apparatus of claim 7, wherein the finger of each mounting pad includes a locking tab that engages with a support member of one mounting tab.

9. The apparatus of claim 8, wherein the finger of the mounting pad further includes a disassembly slot.

10. The apparatus of claim 7, wherein each mounting pad further includes another finger attached to the central area.

11. The apparatus of claim 10, wherein each finger of each mounting pad includes a locking tab that engages with a support member of a different mounting tab.

12. The apparatus of claim 11, wherein each finger of the mounting pad further includes a disassembly slot.

13. The apparatus of claim 1, wherein the mounting tabs are parallel to an edge of the backplate.

14. The apparatus of claim 1, wherein the mounting tabs are not parallel to an edge of the backplate.

15. The apparatus of claim 1, wherein the mounting pads are plastic.

16. The apparatus of claim 1, wherein the mounting pads are metal.

17. An apparatus for mounting an electronic component on a surface in a space limited area comprising:

- a housing adapted to contain the electronic component and including (i) a backplate and (ii) at least one pair of mounting pads disposed on the backplate, the tabs angularly disposed relative to the backplate, each mounting tab including a support member attached to the backplate extending perpendicularly therefrom and a flange member attached to the support member and extending parallel to the backplate, the mounting tabs arranged so that the flange members are disposed towards each other; and
- a bracket secured to the surface comprising:
- a baseplate defining a plane and including at least one mounting pad disposed along and extending perpendicular to the baseplate in the plane, the mounting pad including (i) a central area, attached to the baseplate, and (ii) a finger including a disassembly notch attached to the central area, the finger projecting in the plane and articulable in the plane;
- whereby the angularly disposed housing tabs slidably engage the bracket mounting pads to support the electronic component within the space limited area.

18. The apparatus of claim 17 wherein the tabs may be at any angle from 0 to 360 degrees.

* * * * *

UNITED STATES PATENT AND TRADEMARK OFFICE
CERTIFICATE OF CORRECTION

PATENT NO. : 6,149,115
DATED : November 21, 2000
INVENTOR(S) : Gates et al.

It is certified that error appears in the above-identified patent and that said Letters Patent is hereby corrected as shown below:

In the Inventor category [75], after Frank Vernon Gates, the residence should be Township of "Roxbury", not Township of "Toxbury".

Signed and Sealed this

Twenty-ninth Day of May, 2001

*Attest:*

NICHOLAS P. GODICI

*Attesting Officer*     Acting Director of the United States Patent and Trademark Office